United States Patent
Brown

(10) Patent No.: US 8,316,579 B1
(45) Date of Patent: Nov. 27, 2012

(54) LANDSCAPE STABILIZATION SYSTEMS AND METHODS

(76) Inventor: Kristopher M. Brown, Dallas, TX (US)

(*) Notice: Subject to any disclaimer, the term of this patent is extended or adjusted under 35 U.S.C. 154(b) by 0 days.

(21) Appl. No.: 13/086,217

(22) Filed: Apr. 13, 2011

Related U.S. Application Data

(62) Division of application No. 12/134,895, filed on Jun. 6, 2008, now abandoned.

(51) Int. Cl.
*A01G 17/10* (2006.01)

(52) U.S. Cl. .................................. 47/42; 47/47

(58) Field of Classification Search ............. 47/47, 44, 47/42, 32.7, 32, 32.8, 46; *A01G 13/00, 13/02*
See application file for complete search history.

(56) References Cited

U.S. PATENT DOCUMENTS

| | | | | |
|---|---|---|---|---|
| 1,874,029 A | * | 8/1932 | Condon | 47/58.1 R |
| 2,102,748 A | * | 12/1937 | Rocquin | 47/1.01 R |
| 2,525,890 A | * | 10/1950 | Gage | 119/787 |
| 3,345,774 A | | 10/1967 | Delbuguet | |
| 4,584,792 A | | 4/1986 | Etzel | |
| 4,926,785 A | * | 5/1990 | Lamson | 116/209 |
| 5,361,536 A | | 11/1994 | Myer | |
| 5,430,971 A | | 7/1995 | Myer | |
| 5,473,839 A | * | 12/1995 | Stidham | 47/47 |
| 6,141,903 A | | 11/2000 | Mancini | |
| 6,256,942 B1 | | 7/2001 | Schatz | |
| 6,516,561 B1 | * | 2/2003 | Mancini | 47/42 |
| 6,625,926 B1 | | 9/2003 | Mancini | |
| 6,772,558 B2 | * | 8/2004 | Mancini | 47/42 |
| 7,017,299 B1 | | 3/2006 | Speed et al. | |
| 7,080,479 B2 | | 7/2006 | Dallimore et al. | |
| 2005/0132645 A1 | * | 6/2005 | Johns | 47/42 |
| 2006/0185232 A1 | * | 8/2006 | Spicer | 47/42 |
| 2007/0062109 A1 | * | 3/2007 | Jolley | 47/47 |

OTHER PUBLICATIONS

Attached "How to Install" webpage from Feb. 10, 2007.*
Tree Staple™: Product Information webpage, http://www.treestaple.com/tree.html, 2 pp., last accessed Mar. 24, 2008.
Tree Staple™: How to Install web page, http://www.treestaple.com/howto.html, 22 pp., Mar. 24, 2008.
Border Concepts, Inc., web page, http://www.borderconcepts.com/tomahawk.asp, 2 pp., Mar. 24, 2008.
Office Action mailed Aug. 19, 2010, in U.S. Appl. No. 12/134,895, filed Jun. 6, 2008.
Office Action mailed Jan. 13, 2011, in U.S. Appl. No. 12/134,895, filed Jun. 6, 2008.

* cited by examiner

*Primary Examiner* — Kristen C Hayes
(74) *Attorney, Agent, or Firm* — Haynes and Boone, LLP

(57) ABSTRACT

A system for stabilizing a plant comprises a plurality of stakes and a plurality of horizontal stabilization members, wherein the stakes are inserted through a root ball of the plant into undisturbed soil, and wherein the horizontal stabilization members resist lateral movement of at least one of the stakes.

10 Claims, 6 Drawing Sheets

LANDSCAPE STABILIZATION SYSTEMS AND METHODS

RELATED APPLICATION

This application is a divisional of U.S. patent application Ser. No. 12/134,895, filed Jun. 6, 2008, and entitled "LANDSCAPE STABILIZATION SYSTEMS AND METHODS," which is hereby incorporated by reference in its entirety.

TECHNICAL FIELD

The present disclosure is related to landscaping in general and, more specifically, is related to stabilization structures and methods for trees, shrubs, and the like.

BACKGROUND

Landscapers often work on projects that include planting trees, shrubs, or other items. Trees are typically received with their roots in a pot or wrapped in burlap, and the roots will be in a compact cluster called a root ball. The root ball is placed into a hole and covered with soil. Newly installed tall plants typically benefit from the use of various stabilization techniques so that they grow straight up, even in spite of periodic strong winds and other stimuli. After one to two years, the roots of most plants will have spread and matured to the point that there is no need for external stabilization.

The most popular tree stabilization technique is the use of T-posts that are driven into the ground and stick up out of the ground by about three feet. Each T-post has a guy wire that is attached to the tree and operates to stabilize the tree. However, this above-ground staking solution has several disadvantages. One of the major disadvantages of above-ground staking methods is the effect on the physiology of trees—the methods actually inhibit tree growth. Above-ground staking acts as a crutch by preventing the trunk from swaying in the wind. Such swaying is believed to stimulate the tree to grow its roots to an appropriate size so that the tree can eventually provide its own stabilization. Above-ground staking prevents this natural adaptation. Further, the people who maintain these traditional methods are often careless and fail to remove the staking structures after they are not needed. A tree that is left indefinitely with a guy wire on its trunk will try to defend itself by compartmentalizing (covering the wire with bark and growing around the wire). A guy wire left on a tree will strangulate the tree and reduce its health.

Further, above-ground staking is unsightly and hazardous. For instance, in an open space environment such as a park, there will be children running around. Oftentimes, trees are planted near playgrounds and other attractions, and the height of a T-post is usually set to about the height of a child's head or face, making collisions with T-posts quite dangerous.

An alternative to above-ground staking is staples, such as those marketed under the brand names TREESTAPLE™ and TOMAHAWK™. Staples are one attempt at a solution to stabilize the tree by anchoring it from the root mass. The root mass is basically stapled from the exterior soil with these devices which are made out of metal. Like office-type staples, tree staples have two piercing prongs. Tree staples have one short prong and one long prong. The short prong is inserted into the root ball of a tree, and the long prong is set outside of the root ball and is driven into the soil. Thus, many applications require at least two staples to provide multi-directional stability to a newly planted tree.

Staples are bulky, expensive, and made of metal. One of the main disadvantages of the stapling method is the longevity of the staples. Staples are not removed, and their metal construction allows them to persist for centuries if left undisturbed. The metal is there and stays throughout the life of the tree, which causes safety concerns such as tripping hazards, especially when the staples become exposed by, e.g., soil erosion.

Another disadvantage is that some soils are very hard and prevent full insertion of staples. However, the length of staples cannot typically be adjusted by landscapers during tree installation. Thus, an installer may have to choose between using another technique and allowing some amount of above-ground exposure for the staple.

BRIEF SUMMARY

Various embodiments of the present invention are directed to systems and methods for providing stability to landscaping items. In one example, two or more discrete rods are each driven through the root ball and into the underlying soil to stabilize the root ball in place. Horizontal support members are then applied to the rods and are fastened to the rods using nuts.

In some embodiments, one or more parts of the support structure are made of biodegradable materials, such as wood, bamboo, biodegradable plastic, and/or the like. Thus, in addition to providing stability, the structure can also naturally decompose after the structure is not needed.

Once the rods are driven in to the root ball and ground, they can be cut so that the overall structure can be covered with soil and/or mulch. The end results in some instances is a support structure that is not in view, is not a hazard for people walking or playing, and is not likely to persist for long after it is not needed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
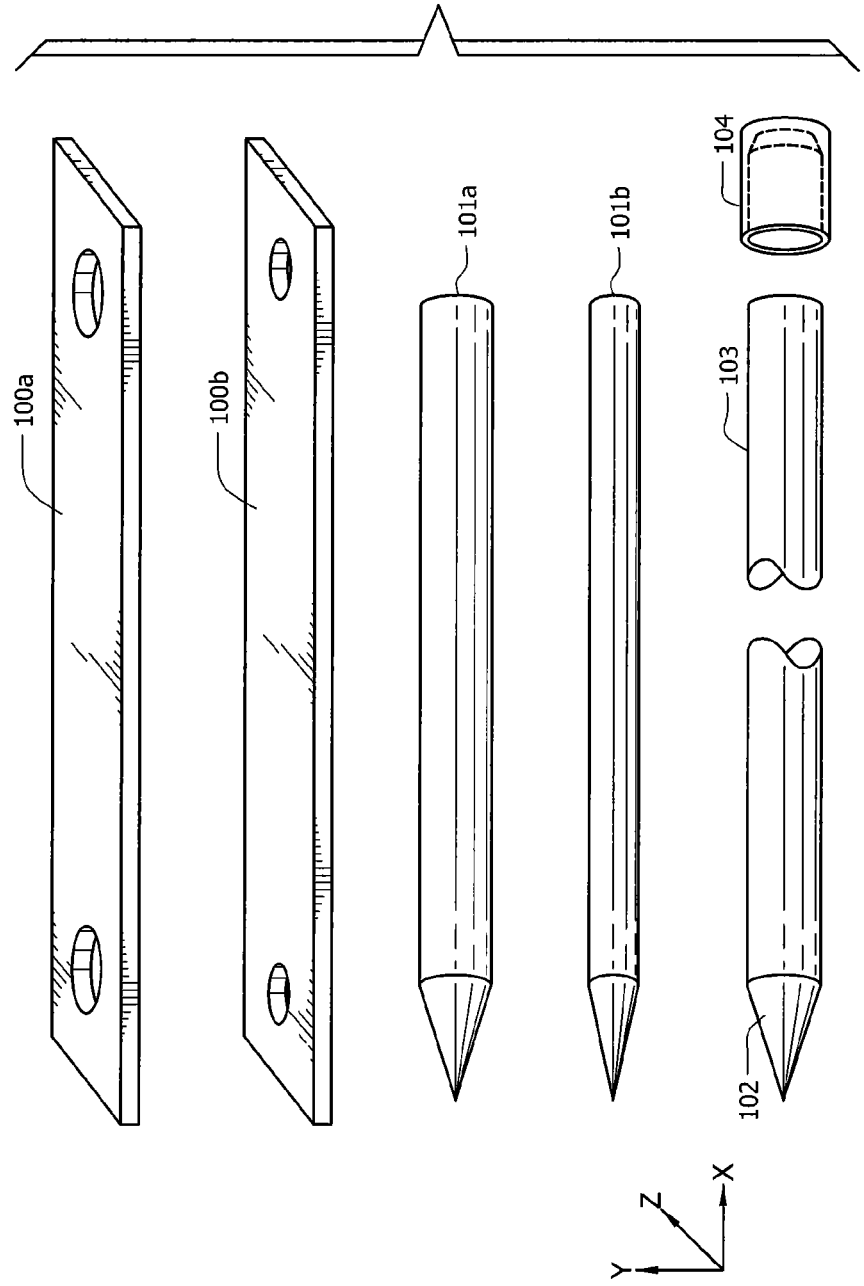
FIG. 1 is an illustration of an exemplary system adapted according to one embodiment of the invention.

FIG. 1 is an illustration of exemplary system 110 adapted according to one embodiment of the invention. System 110 includes slats 100 and stakes 101.

Stakes 101 can be made of any of a variety of materials, and in some embodiments are made from biodegradable materials, such as wood. In fact, stakes 101 can be made of any material with enough longitudinal rigidity to allow them to be forced through a tree's root ball and into the underlying ground. Each stake includes tapered end 102 and flat end 103. Flat end 103 can, for example, be hit with a hammer in order to drive tapered end 102 through a root ball and into the ground. System 110 can also include shield 104, which is placed over flat end 103 during hammering in order to protect flat end 103 from direct hammer blows. Shield 104 can then be removed after a stake 101 is driven to its desired depth. Stakes 101 may also be referred to as providing vertical support. However, it is not required that stakes 101 be arranged exactly vertically, as substantially vertically is within the scope of embodiments.

Slats 100 can also be made out of a variety of materials, and especially biodegradable materials, such as wood, bamboo, biodegradable plastic (hereinafter referred to as "bioplastic," an example of which is the corn-based plastic available under the name MIREL™), and the like. Typically, slats 100 are long, flat strips of material with thicknesses much smaller than the length and width dimensions. The dimensions of each slat 100 can be tailored for its intended use. For example, when used with a root ball that is three feet in diameter, a slat 100 may have a two-foot length, a three or four inch width, and a ¼-inch thickness. In another example, a five-gallon shrub or tree may suffice with slat 100 being ⅛-inch thick, two or three inches wide, and around a foot in length. However, embodiments of the invention are not limited to any dimension for stakes 101 or slats 100, as dimensions may differ for different applications. Slats 100 may also be referred to as providing horizontal support. However, it is not required that slats 100 be arranged exactly horizontally, as substantially horizontally, or otherwise conforming to a top surface of a root ball, is within the scope of embodiments.

In various embodiments, stakes 101 are driven through a root ball of a newly-planted tree, while slats 100 are placed parallel to the soil to provide lateral stability to stakes 101. Slats 100 are placed so that the tops of stakes 101 fit through the holes in slots 100. Slots 100 are then placed on top of the root ball in a substantially horizontal configuration, as shown in more detail in FIGS. 3 and 4.

Figure 2A:
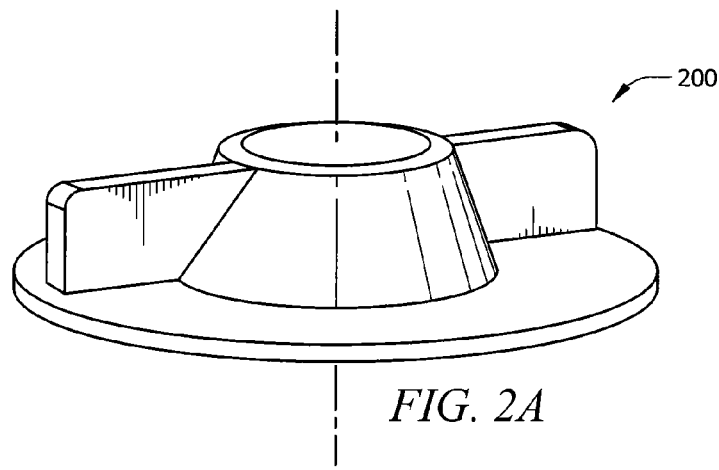
FIGS. 2A-G show views of exemplary nuts, adapted according to one embodiment of the invention.
Figure 2B:
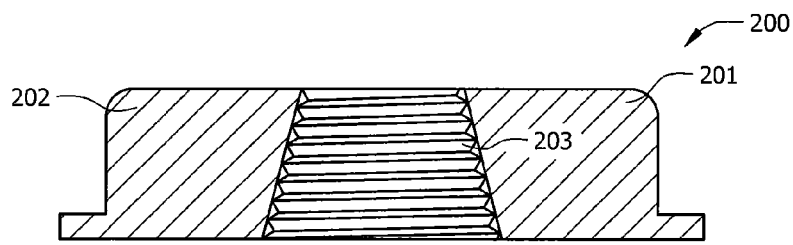
Figure 2C:
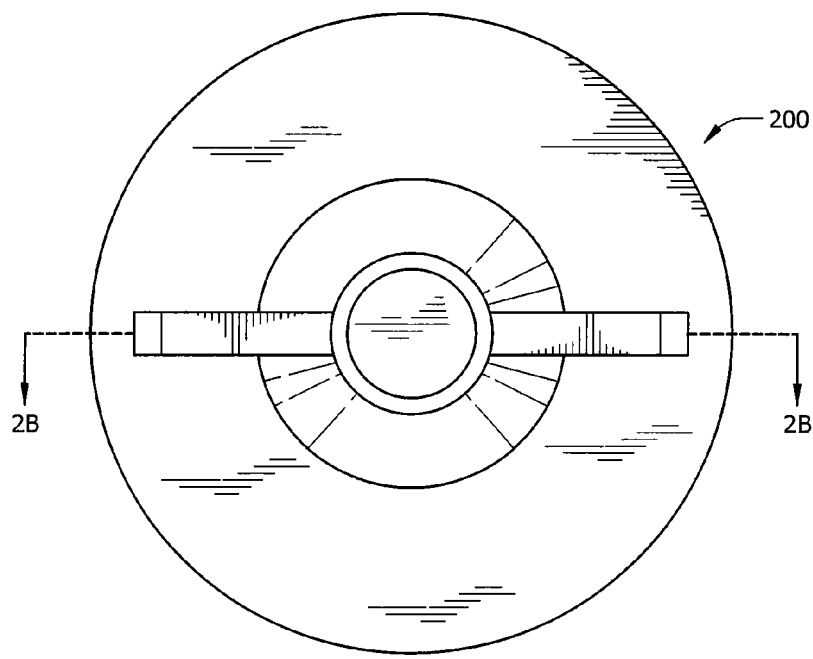

FIGS. 2A-C show views of nut 200, adapted according to one embodiment of the invention. After stakes (e.g., stakes 101 of FIG. 1) have been driven, and after slats (e.g., slats 100 of FIG. 1) have been placed onto the stakes, nuts, such as nut 200, are then fastened to the protruding portions of the stakes in order to hold the slats in place.

Nut 200 can be made of any of a variety of materials, and especially from bioplastics. Nut 200, in this example, includes grippable surfaces 201 and 202 (in this case, wings) to allow a user to hand tighten nut 200 during installation of the landscaping system. Hand tightening, as opposed to tightening with power tools, is favorable in many embodiments, since excess torque on nut 200 can often cause a stake to partially pull out.

Nut 200 in this example also includes slightly tapered threads 203, allowing fastening to be accomplished by turning nut 200 so that it moves down the stake and contacts the slat. In many embodiments, the stakes do not have threads. Instead, nut 200 includes threads that press into the outer surface of a stake, thereby threading the stake during the fastening process.

Figure 2D:
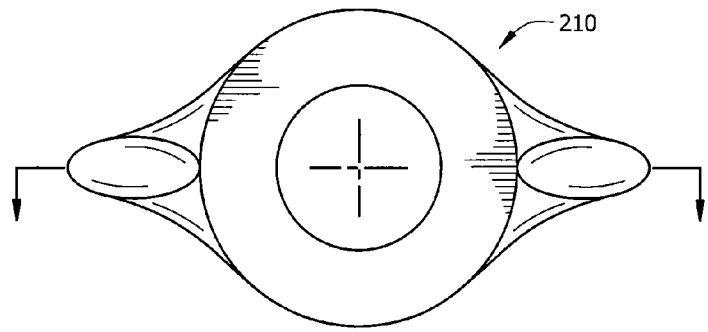
Figure 2E:
Figure 2F:
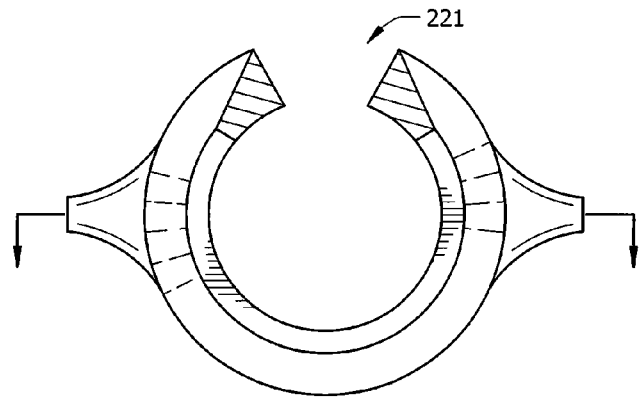
Figure 2G:
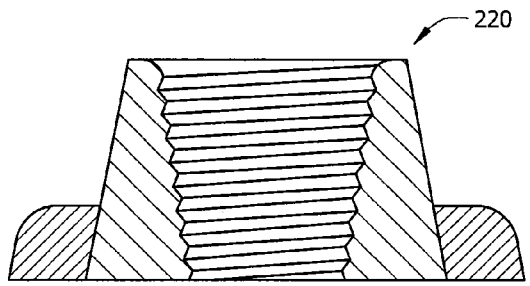

FIGS. 2D and E show views of nut 210, adapted according to one embodiment of the invention. Nut 210 has a lower profile than that of nut 200, thereby making nut 210 easier to conceal under a thin layer of soil. FIGS. 2F and G show views of nut 220, adapted according to one embodiment of the invention. Nut 220 does not make a full circle, as shown in FIG. 2F. In one example, nut 220 can be placed onto a stake at any of various heights of the stake by forcing missing section 221 laterally onto the stake.

Nuts 200, 210, and 220 of FIGS. 2A-G are exemplary, as nuts 200, 210, and 220 are not limited to any particular dimension, shape, or material, as different applications may use different types of nuts. For example, different shapes for threads 203 may be used, as well as different gripping surfaces 201, 202. In fact, in some embodiments, threads 203 may be omitted altogether for another method of fastening, and grippable surfaces 201, 202 may be omitted in some cases when only power tool fastening is envisioned.

Figure 3:
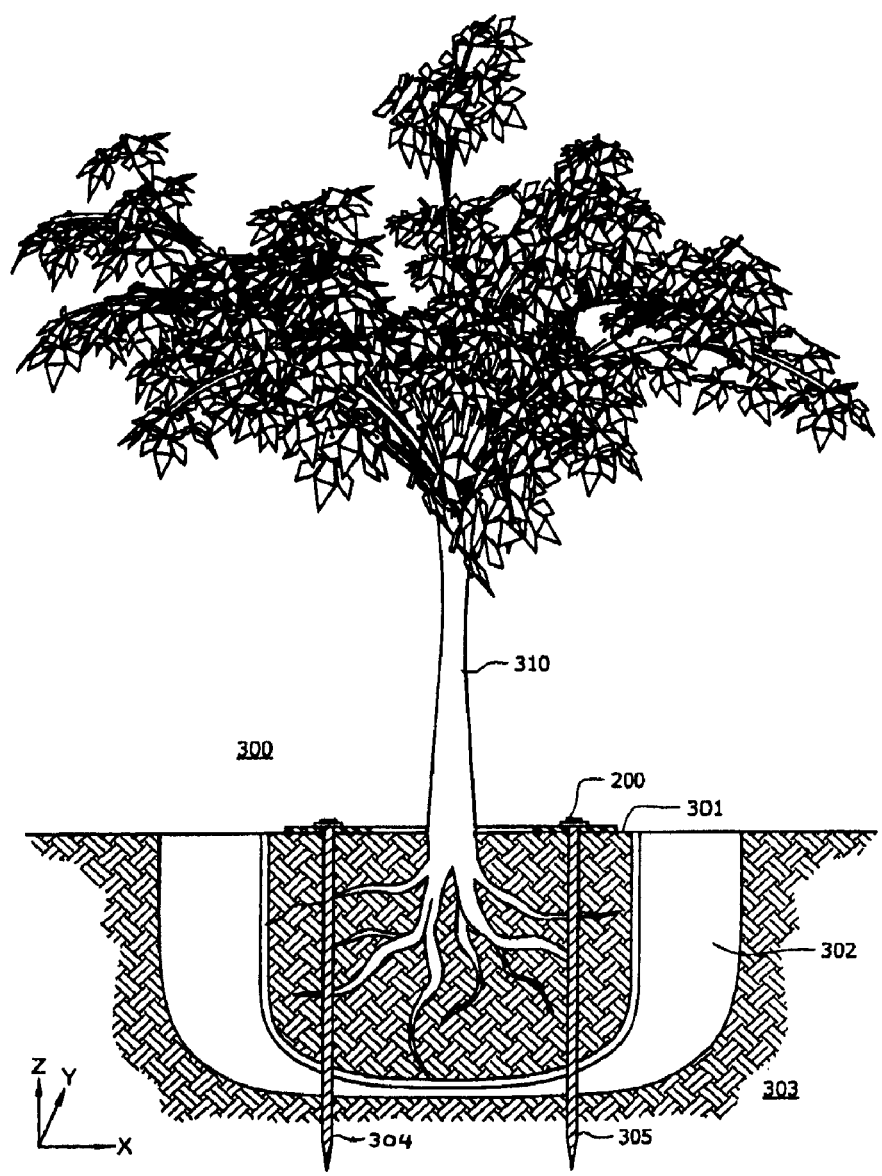
FIG. 3 is an illustration of an exemplary system installed according to one embodiment of the invention.

FIG. 3 is an illustration of exemplary system 300 installed according to one embodiment of the invention. In FIG. 3, tree 310 includes root ball 301, which is disposed in hole 302. Placing a root ball in a hole in a common scenario in landscaping when planting trees, shrubs, and other plants.

In the presently illustrated embodiment, after hole 302 has been dug, tree 310 is installed. Stakes 304 and 305 are then driven through root ball 301 into native, undisturbed soil 303 so that root ball 301 is held in place by stakes 304 and 305. Typically, stakes 304 and 305 are driven in as far as possible while leaving some amount of stakes 304 and 305 protruding so that slats can be fastened thereto with nuts. Some soils are very hard, thereby allowing only a small amount of penetration into undisturbed soil 303. However, as long as at least one of stakes 304, 305 penetrates at least some amount into undisturbed soil 303, tree 310 will experience increased stability versus having no stabilization system at all.

After stakes 304, 305 are driven into place, slats (not shown) are installed on the protruding ends of stakes 304, 305. Depending on how much of stakes 304, 305 protrude from the ground, it may be desirable to cut off a length of one or more of stakes 304, 305. For example, if stake 304 protrudes out of root ball by a foot, and if only three inches are needed to accommodate a nut, then a user may cut off nine inches of stake 304. This may be especially convenient when stakes 304, 305 are constructed of a material, such as wood, which is easily cut with common tools.

Next, the nuts (not shown) are fastened onto the ends of stakes 304, 305 by, for example, hand tightening. After the nuts are tightened, a user may cut off more of stakes 304, 305, if desired. The slats provide stability for stakes 304, 305 by holding stakes 304, 305 in place, preventing lateral movement. The nuts provide stability for the slats by preventing vertical movement that would otherwise remove slats from stakes 304, 305.

The system shown in FIGS. 1-3 can be analogized to a system for stabilizing a ball (root ball 301) in a socket (hole 302). Generally speaking, if there is a ball in a socket and pins are run through that ball and into the socket, that ball will not typically roll around in the socket. Embodiments of the invention offer additional stability in the form of the slats. The slats provide a way of securing the pins (stakes 304, 305) against ball and socket movement. Generally, the more pins and slots that are used, the more stability that is imparted to the tree (or other plant).

Figure 4A:
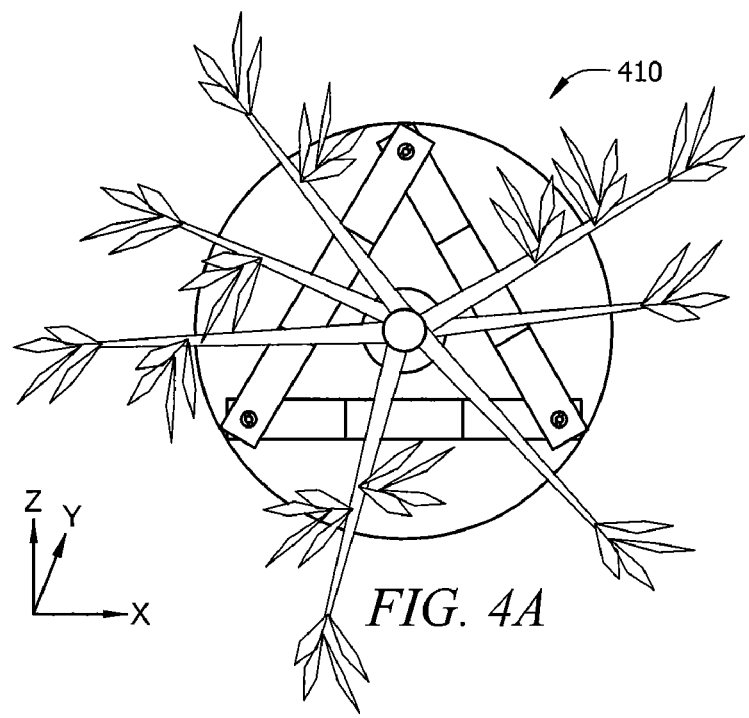
FIGS. 4A-C are illustrations of exemplary configurations adapted according to three embodiments of the invention.

Stakes, such as stakes 304 and 305, can be arranged in a variety of ways. For instance, while FIG. 3 shows two stakes (304 and 305) other embodiments can include more than two stakes. In one embodiment, three stakes are driven into the root ball. Then, three slats are used to stabilize the stakes and are arranged in a triangle, as shown in FIG. 4A, which is a view from above. In the triangle arrangement of FIG. 4A, each slat is coupled to two stakes, thereby forming one side of the triangle. Further, the root ball (e.g., root ball 301 of FIG. 3) is held in place by three stakes so that is stabilized against 360 degrees of lateral movement.

Figure 4B:
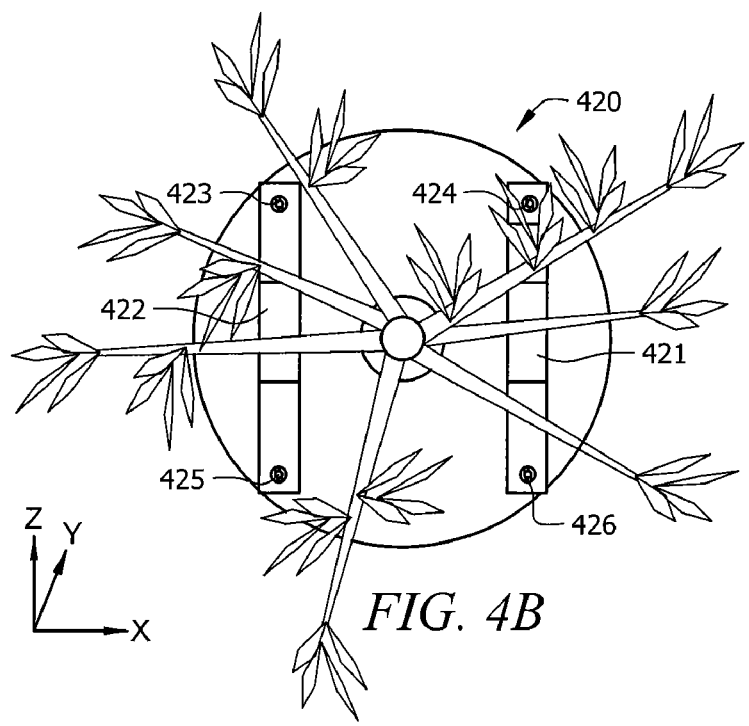
Figure 4C:
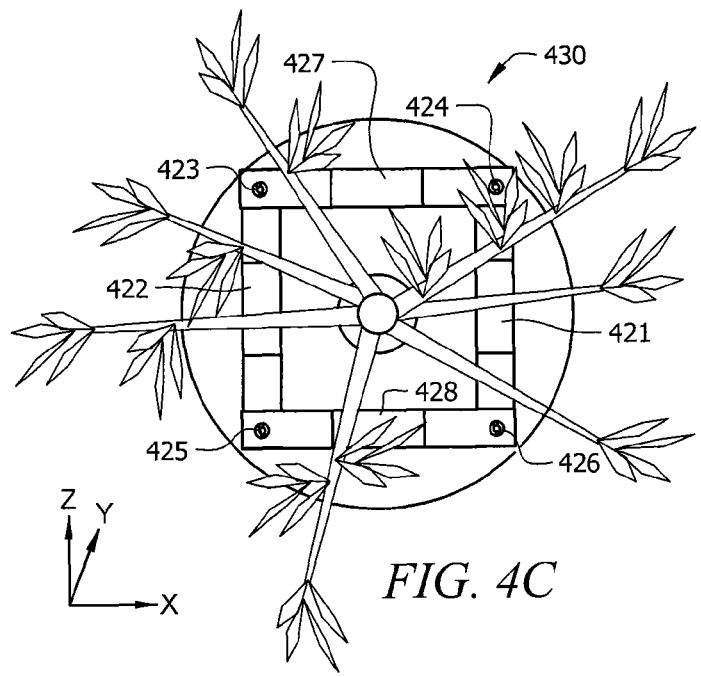

FIG. 4B is an illustration of exemplary configuration 420 adapted according to another embodiment of the invention. Configuration 420 has four stakes (not shown in this view), two slats 421 and 422, and four nuts 423-426. Slats 421, 422 are arranged in parallel lines but are not coupled to each other. FIG. 4C is an illustration of exemplary configuration 430 adapted according to yet another embodiment of the invention. Configuration 430 is similar to configuration 420 in that it has four stakes and four nuts 423-426, but configuration 430 adds slats 427 and 428. The addition of two slats to configuration 430 provides greater stability than in configuration 420. However, additional materials will typically add to cost, so that some embodiments may allow a user to balance cost against desired stability so that an optimum relationship between price and performance can be achieved for a given project. Other arrangements are possible and are within the scope of embodiments.

Figure 5:
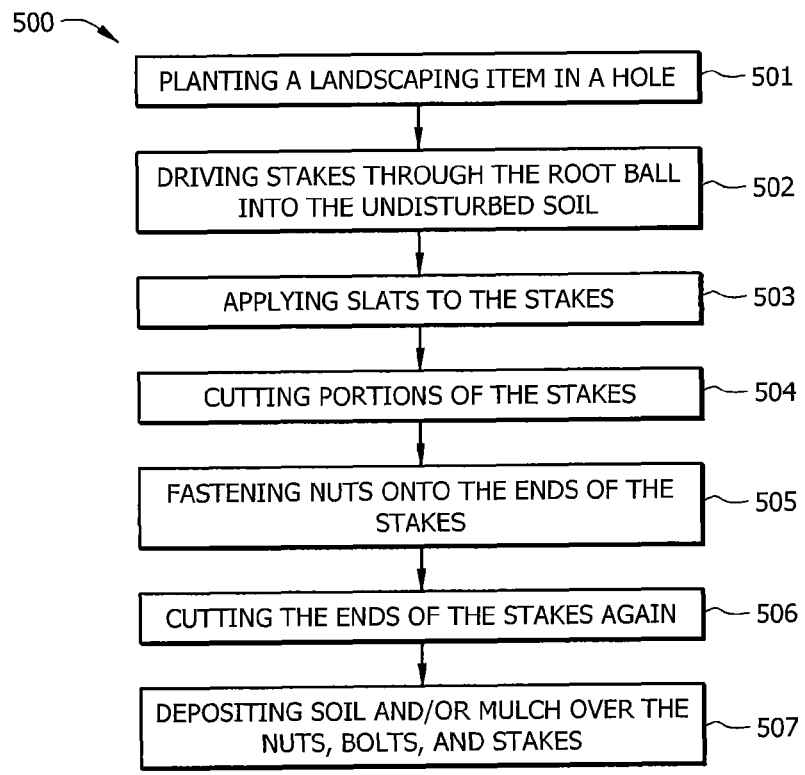
FIG. 5 is an illustration of an exemplary method adapted according to one embodiment of the invention.

Various embodiments of the invention include methods for installing and/or stabilizing landscaping items, such as trees, shrubs, and the like. FIG. 5 is an illustration of exemplary method 500 adapted according to one embodiment of the invention. Method 500 may be performed, for example, by a human user with a system, such as that shown in FIGS. 1-3.

In step 501, a landscaping item (e.g., tree, shrub, etc.) is planted in a hole. The soil surrounding the hole, in this example, is undisturbed, native soil.

In step 502, stakes are driven through the root ball of the landscaping item so that each stake penetrates both the root ball and the undisturbed soil. Step 502 may be performed, for example, by pounding flat ends of the stakes with a sledgehammer or mallet until a desired penetration is achieved.

In step 503, slats are applied to the stakes. In some embodiments, the slats may be modified, such as by being cut to a desired length or having one or more holes added to accommodate stakes. In fact, in many embodiments, the arrangement of the stakes determines the length and hole placement of the slats, and the slats are modified after the stakes are driven in order to accommodate the arrangement of the stakes.

In step 504, some excess protruding portions of one or more of the stakes are cut off. In step 505, nuts are fastened onto the ends of the stakes to secure the slats. In step 506, the ends of the stakes are cut again. For example, a user may desire to cut the ends of the stakes to be flush with the tops of the nuts.

In step 507, soil is deposited over the root ball of the landscaping item to fill in the volume around the sides of the root ball. Then, soil and/or mulch is used to cover over the slats, nuts, and stakes. In some embodiments, the stabilization system that includes the stakes, slats, and nuts may be completely covered by soil and/mulch after installation.

Methods according to various embodiments of the invention are not necessarily limited to method 500. Other embodiments may add, delete, rearrange, or modify various steps. For instance, it is possible that one or more of steps 504 and 506 may be omitted, especially if the stakes are driven deeply into the soil. Further, various embodiments may omit the slats, thereby using only the stakes (and possibly, nuts) to stabilize the landscaping item.

Embodiments of the invention may provide advantages over prior art tree stabilization systems. For example, some embodiments may include stakes, slats, and nuts that are manufactured entirely of biodegradable materials. Thus, in most soils after several years or decades, the biodegradable materials will be decomposed. Decomposition helps to minimize the possibility that one or more parts of the structure may erupt from the soil over time or to interfere with other landscaping activities in the future. This is in contrast to prior art staples that are made of metal and can last for hundreds or thousands of years in the soil.

Further, some biodegradable materials, such as wood and bamboo, can be treated with formulas to expedite biodegradation and/or fertilize the ground at the same time. Wood and bamboo are porous materials and can be exposed to various fertilizers, hormones, vitamins, minerals and/or the like to benefit the soil as an added feature to the structural stability of the apparatus.

Moreover, various embodiments of the invention can have surface footprints that are entirely within the footprint of the root ball. Such quality follows from the fact that the stakes are driven directly into the root ball, and the slats are deployed on the root ball or on a small layer of soil on top of the root ball. A small footprint helps to minimize intrusion of the structure into surrounding areas, where, e.g., children play or other items are planted. This is in contrast to prior art above-ground staking systems that can extend a meter or more in each direction from a tree and create hazards. This is also in contrast to prior art staples that that each have one prong within a root ball and another prong outside of the root ball.

In addition to a smaller footprint various embodiments can provide more stability than current staple solutions. For instance, a given stake penetrates the root ball and also penetrates the soil, thereby acting as a pin through a ball and a socket. This is contrast to the staples that do not actually penetrate through the root ball. Instead, prior art staples use a short prong within the root ball and a long prong in the soil, leaving some freedom of movement for the root ball.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for installing a tree, the method comprising:
   placing a root ball of the tree into a hole in ground;
   inserting a plurality of biodegradable stakes into a root ball of the tree so that each of the stakes penetrates the root ball and extends from a top of the root ball through the root ball and into undisturbed soil at a point below the root ball in the hole;
   horizontally stabilizing the plurality of stakes using a plurality of slats, each of the slats having a thickness much smaller than a length and width dimension thereof, the slats being placed on or above the root ball and including holes through which the penetrating means are inserted, in which a footprint of the stakes and the slats is entirely within a footprint of the root ball;
   cutting excess portions of the stakes;
   securing the slats to the stakes using nuts fastened to the tops of the stakes;
   a second cutting step cutting the stakes flush with the tops of the nuts; and
   covering the root ball, slats, stakes and nuts with loose soil.

2. The method of claim 1, wherein the stakes are installed distally to the trunk.

3. The method of claim 1 in which inserting the plurality of stakes comprises:
   hammering the plurality of stakes through the root ball.

4. The method of claim 3 in which hammering comprises:
   protecting hammering ends of the plurality of stakes using a shield.

5. The method of claim 1 wherein said stakes comprise wood.

6. The method of claim 1 wherein said stakes comprise bioplastic.

7. The method of claim 1 wherein said slats comprise bamboo.

8. The method of claim 1 in which the stakes comprise a first biodegradable material that is porous, the stakes further comprising at least one of:
   fertilizer; vitamins; and hormones.

9. The method of claim 1 in which the plurality of stakes are installed vertically.

10. The method of claim 1 in which the nuts include grippable surfaces and threads, further in which securing the slats to the stakes using nuts comprises tightening the nuts onto the stakes using the threads.

* * * * *